United States Patent [19]
Delwiche

[11] Patent Number: 5,251,016
[45] Date of Patent: Oct. 5, 1993

[54] CHROMA KEYER WITH SECONDARY HUE SELECTOR

[75] Inventor: James A. Delwiche, Grass Valley, Calif.

[73] Assignee: The Grass Valley Group, Inc., Nevada City, Calif.

[21] Appl. No.: 880,861

[22] Filed: May 11, 1992

[51] Int. Cl.⁵ .............................................. H04N 5/275
[52] U.S. Cl. ........................................ 358/22; 358/183
[58] Field of Search .................... 352/183, 22, 182, 27, 352/28

[56] References Cited

U.S. PATENT DOCUMENTS

| | | | |
|---|---|---|---|
| 4,409,611 | 10/1983 | Vlahos | 358/22 CK |
| 4,496,960 | 1/1985 | Hausdörfer et al. | 358/23 CK |
| 4,713,695 | 12/1987 | Macheboeuf | 358/22 CK X |

Primary Examiner—Victor R. Kostak
Attorney, Agent, or Firm—Francis I. Gray

[57] ABSTRACT

An improved chroma keyer has a secondary hue selector for chrominance suppression of "blue fringing" effects. The second hue selector provides a second chroma key signal from a foreground video signal, with the selected hue being offset from that of a primary hue selector. A matte generator having a hue corresponding to the hue of a backing in the foreground video signal is modulated as a function of the second chroma signal. The modulated hue from the matte generator is subtracted from the foreground video signal to produce a modified foreground video signal. The modified foreground video signal is converted into a shaped foreground video signal. The shaped foreground video signal is combined with a shaped background video signal to produce a composited output video signal. The shaped background video signal is a function of a background video signal and a primary chroma key signal from the primary hue selector.

9 Claims, 4 Drawing Sheets

CHROMA KEYER WITH SECONDARY HUE SELECTOR

BACKGROUND OF THE INVENTION

The present invention relates to video chroma keyers, and more particularly to an improved chroma keyer with a secondary hue selector for chrominance suppression of "blue fringing" effects resulting from incomplete chrominance suppression of a backing color around the edges of an object in a foreground video video.

In chroma keying operations an object is presented in a studio set, with the studio set color providing a specific background hue. A hue selector circuit detects the specific color of the set, or backing, and creates a mixing, or chroma key, signal based on the presence or absence of this color in the foreground video signal. When the color is present, the foreground video signal is suppressed, and a second background scene is substituted to present the illusion of the foreground object being in the same scene as the substituted background. For example a weatherman may actually stand in front of a studio set having a blue or green backing, but appear to be standing in front of an animated weather map.

One basic form of a chroma keyer is to mix the foreground and background signals according to the following equation:

$$\text{Composite} = (FG \times (1 - SH)) + (BG \times SH))$$

where Composite is the resulting video signal, FG is the foreground video signal, BG is the background video signal and SH is the chroma key signal, or the amount of selected hue present. This defines a multiplicative keyer such as is disclosed in U.S. Pat. No. 4,488,169 issued Dec. 11, 1984 to Yamamoto entitled "Digital Chromakey Apparatus."

A second basic form of a chroma keyer alters the foreground video by subtracting the chrominance and luminance of the backing color from the foreground video. A matte generator is set to the same hue as the hue selected for the backing color. The luminance of the matte generator is set to zero so that the output is only a chrominance signal without luminance. This matte color is then multiplied by the chroma key signal derived from the foreground video according to the hue from a hue selector. The resulting modulated matte color is subtracted from the foreground video. In the case of a composite system the subtraction is performed by using vector subtraction, while in the case of a component system the subtraction is performed directly on the appropriate component signal. The resulting modified foreground video signal presents the foreground object over a gray background. A second subtraction of a luminance signal, also derived from the hue selector, from the modified foreground video signal produces a shaped foreground video signal with the foreground object presented over black.

Once the shaped foreground signal has been created in this manner, the background signal is keyed in identically as in the multiplicative keyer according to the equation:

$$\text{Composite} = MFG + (BG \times SH)$$

where MFG is the shaped foreground signal with chrominance and luminance around the foreground object suppressed. This second technique has the advantage of not multiplying the foreground video by the (1-key) signal. An example of this subtractive technique is disclosed in U.S. Pat. No. 4,409,611 issued Oct. 11, 1983 to Vlahos entitled "Encoded Signal Color Image Compositing."

Chroma keyer systems may be in either component, where luminance and chrominance are carried in separate channels, or composite, where the chrominance is encoded onto the luminance, implementations. In either case the hue selector is preferably driven with a component version of the foreground video signal so that full bandwidth chrominance information is used. In the event that the foreground video is available only in composite form, a decoder is included to produce the component version of the foreground video signal.

A fundamental problem with these techniques is "blue fringing", where in the common case of a blue backing incomplete suppression of the foreground video signal occurs around the edges of the foreground object. This occurs for two reasons.

First the frequency response of a camera and associated equipment is limited, so that where the edge of the foreground object meets the backing color, a soft transition between the foreground object color and the backing color occurs. Where this transition is taking place, the hue selector no longer recognizes the hue, or color, as being the selected hue, or backing color, so that the foreground video signal is selected even though the foreground video signal still contains a fairly high content of the backing color. This results in "blue fringing" around the foreground object when a blue backing is used.

Second if a foreground object is presented with hair, fur, transparency or translucency, the backing color shines through or reflects partially off the object, effectively mixing the color of the foreground object with the backing color. For example, if a blonde-haired performer is presented in front of a blue backing, the yellow hue of fringes of the hair is mixed with the blue color of the backing to create a halo of hair with a greenish cast. In this case the hue selector should not key out this hair, since that would present an unnatural shape to the performer's head. When the performer is keyed into a background scene without any blue content, the eye detects the discolored fringe as having a noticeably blue appearance.

In the prior art, blue fringing effects have been dealt with by changing the shape of the chroma key signal with a mask. But the mask is arbitrary and must be established manually.

What is desired is an improved chroma keyer for suppressing the blue fringing effect automatically without masking.

SUMMARY OF THE INVENTION

Accordingly the present invention provides an improved chroma keyer with a secondary hue selector for suppressing blue fringing effects. The secondary hue selector is used to modify only the chrominance suppression without affecting the chroma key signal used for the actual compositing of a foreground video signal with a background video signal. The secondary hue selector detects a second range of hues related to the primary hue selector where the "blue fringing" effect is present. The output of the secondary hue selector modifies the output of a matte generator, either directly or in combination with the output of the primary hue selector. The modified matte generator output is subtracted from the foreground video. The modified foreground video is then either mixed with the chroma key signal from the primary selector in a multiplicative keyer, or input to another circuit where the luminance is subtracted in a subtractive keyer. The resulting shaped foreground video signal is then combined with a background video signal shaped by the inverse of the chroma key signal to produce a composited video output signal.

The objects, advantages and other novel features of the present invention are apparent from the following detailed description when read in conjunction with the appended claims and attached drawing.

DESCRIPTION OF THE PREFERRED EMBODIMENT

Figure 1:
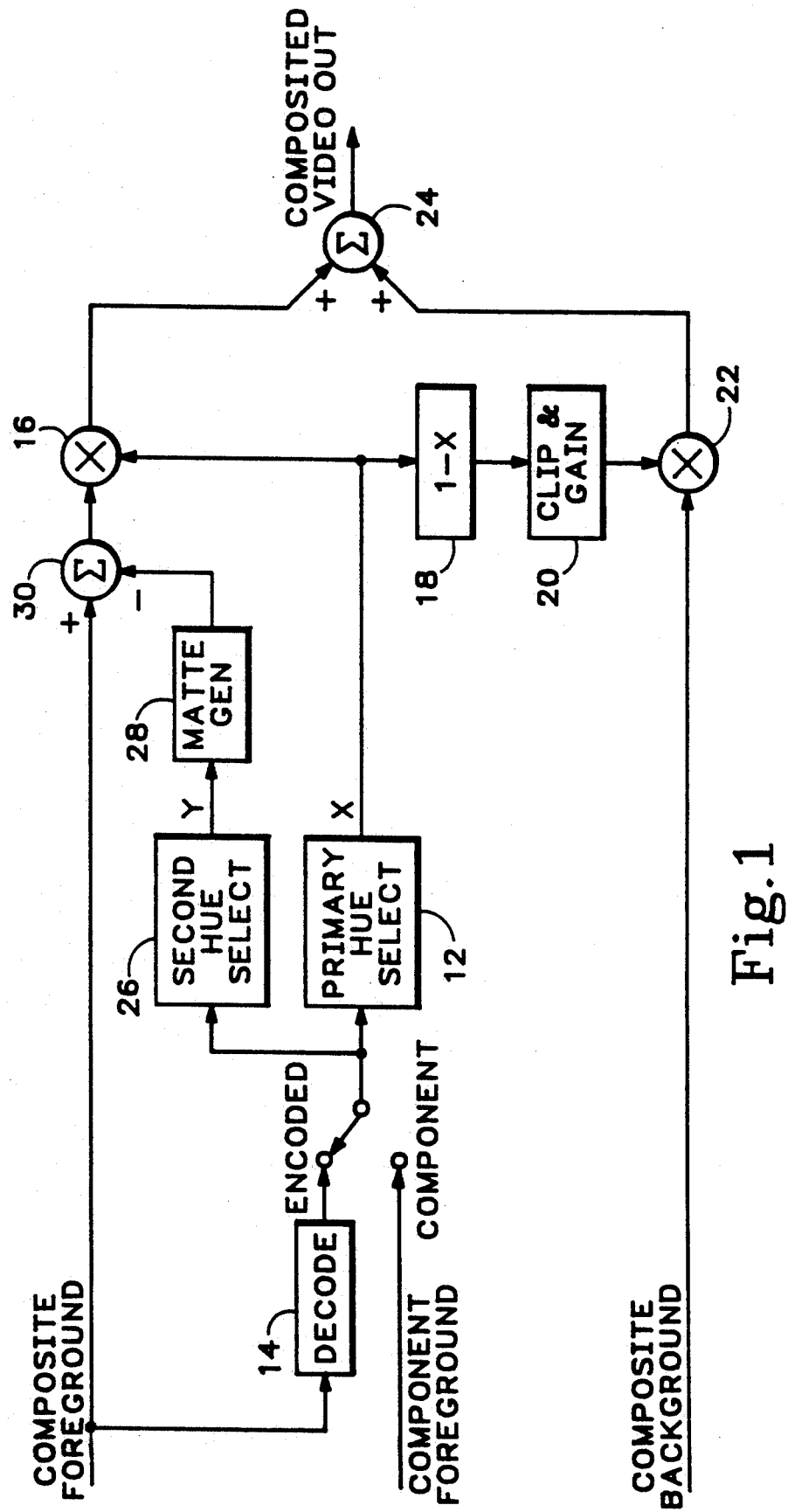
FIG. 1 is a block diagram view of a multiplicative chroma keyer with a secondary hue selector according to the present invention.

Referring now to FIG. 1 a component version of a foreground video signal having a foreground object in front of a colored backing is input to a primary hue selector 12. If the foreground video signal is in composite form and there is no corresponding component form, then the input to the primary hue selector 12 is from a decoder 14 that converts the composite foreground video signal into a component foreground video signal. The output of the primary hue selector 12 is a chroma key signal X having one value when the hue of the foreground video signal falls within the range of hues defined by the hue selector 12, and having another value elsewhere. The chroma key signal X is input to a first multiplier 16 to produce a shaped foreground video signal, and to an inverse circuit 18 to produce an inverse chroma key signal 1-X. The inverse chroma key signal 1-X is input to a clip and gain circuit 20, the output of which is input to a second multiplier 22. Also input to the second multiplier 22 is a background video signal to produce a shaped background video signal having a hole cut in it for the foreground object. The outputs of the multipliers 16, 22 are input to a combiner circuit 24 to produce a composited video signal output that presents the appearance of the foreground object being in the scene of the background video signal.

In addition to the conventional elements of a multiplicative keyer described above, a secondary hue selector 26 receives the component foreground video signal as an input and produces a secondary chroma key signal Y. The secondary chroma key signal Y is input to a matte generator 28. The matte generator 28 produces a fringe chrominance signal that is combined with the foreground video signal in a fringe combiner circuit 30. The modified foreground video signal from the fringe combiner circuit 30 is input to the first multiplier 16 to produce the shaped foreground video signal. The hue range for the secondary hue selector 26 is chosen so that, when combined with the foreground hue signal, the fringing effects are "pushed" back into the range of color values encompassing the foreground object, i.e., the green resulting from the combination of yellow hair and blue backing becomes more closely like the yellow hair.

Figure 2:
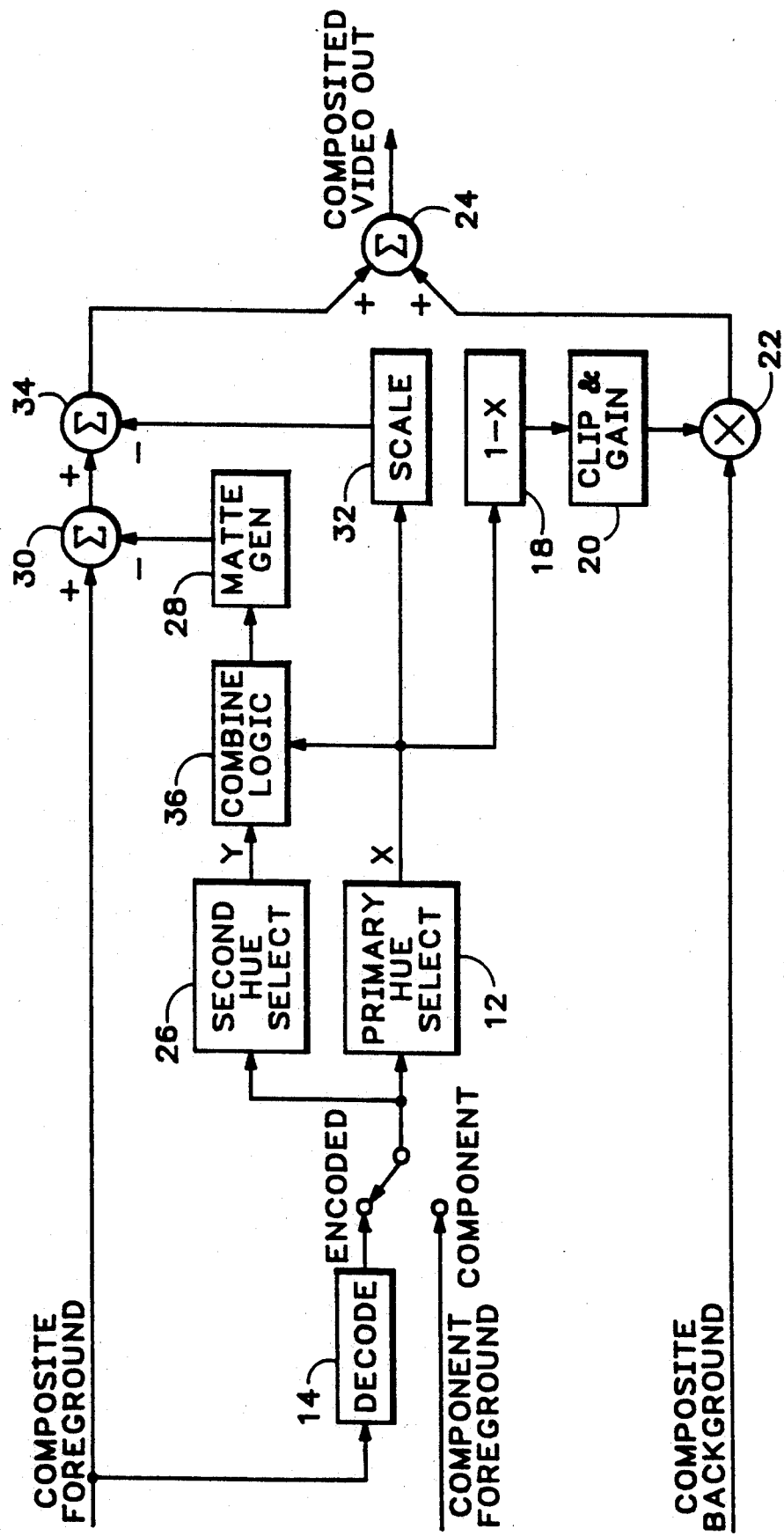
FIG. 2 is a block diagram view of a subtractive chroma keyer with a secondary hue selector according to the present invention.

In a subtractive keyer, as shown in FIG. 2, the chroma key signal X is input to a scaling circuit 32 to produce a luminance suppression signal. The luminance suppression signal is input to a luminance combining circuit 34. Conventionally the chroma key signal X also is input to the matte generator 28 to produce a chrominance suppression signal. The chrominance suppression signal is combined with the foreground video signal in the combining circuit 30 to produce a modified foreground video signal having the foreground object against a gray backing. The modified foreground video signal is input to the luminance combining circuit 34 to produce the shaped foreground video signal. However the present invention includes the secondary hue selector 26, the output of which is combined with the output of the primary hue selector 12 in a combining logic circuit 36. The output of the combining logic circuit 36 provides a control signal for modulating the output of the matte generator 28. The combining logic circuit 36 is preferably a non-additive mixer, but alternatively it may select between the secondary or primary chroma keys, or it may add the two inputs, limiting them to a fixed maximum value.

Figure 3:
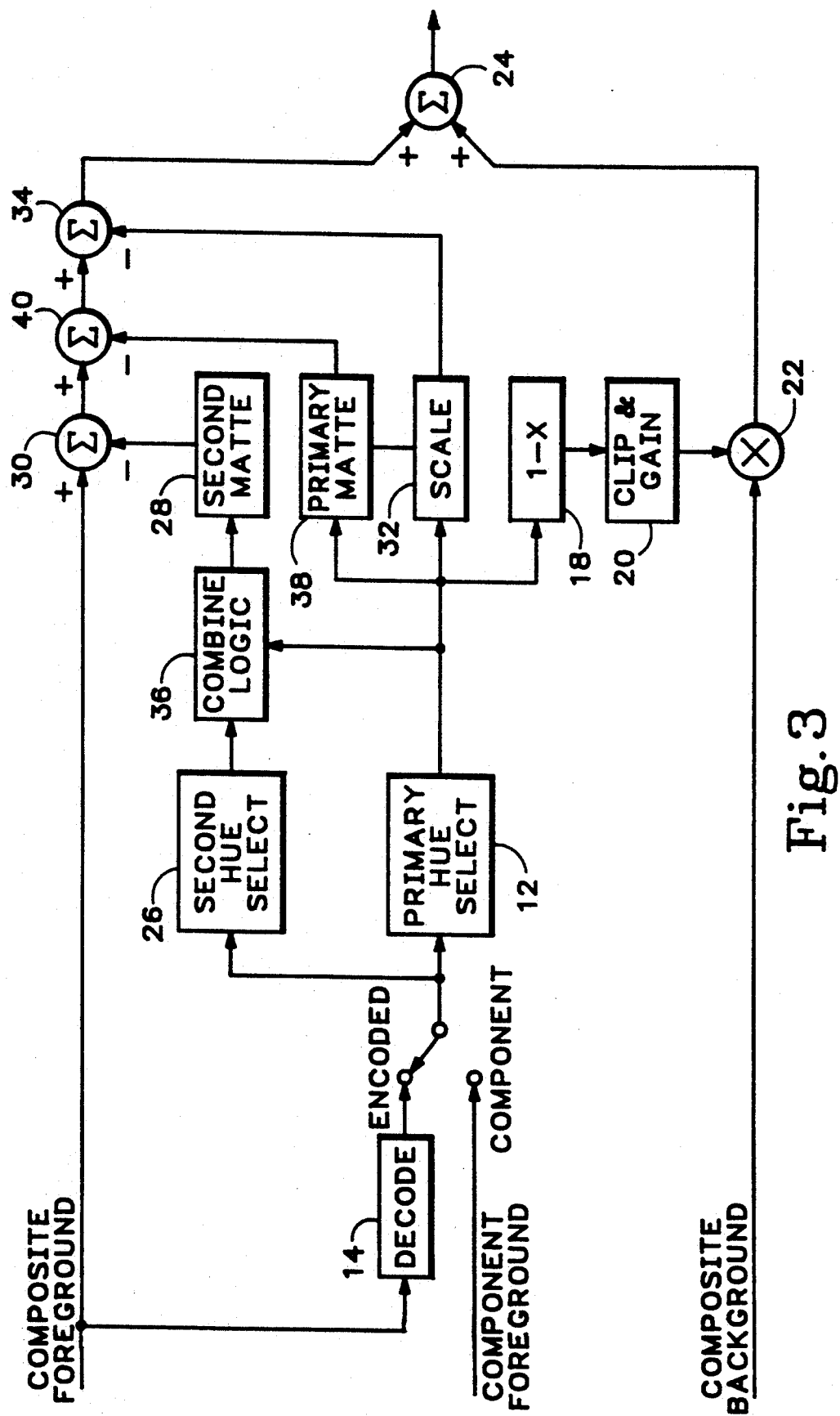
FIG. 3 is an alternative block diagram view of a subtractive chroma keyer with a secondary hue selector according to the present invention.

In another embodiment of the subtractive keyer, as shown in FIG. 3, a second matte generator 38 is modulated by the output of the primary hue selector 12. The output of the second matte generator 38 is combined with the foreground video signal by a suppression combiner circuit 40. The chroma, fringe and luminance suppression, or combination with the foreground video signal, may be performed in any order.

Figure 4:
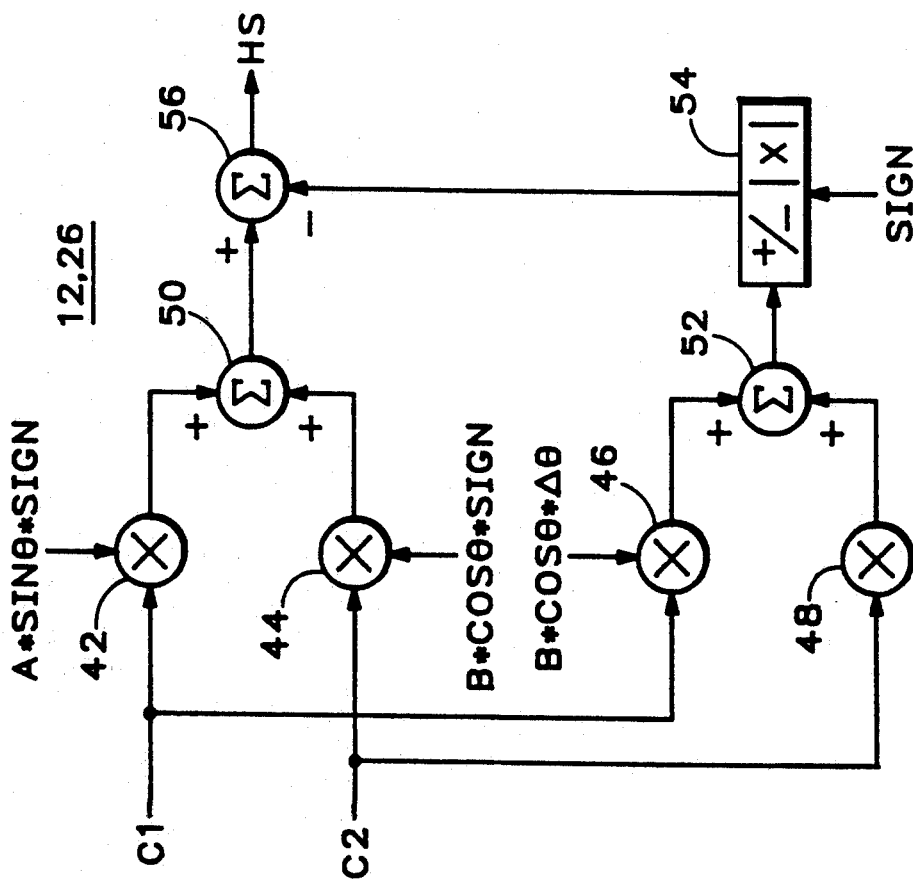
FIG. 4 is a block diagram of a typical hue selector for use in the present invention.

The primary and secondary hue selectors 12, 26 have identical architectures, as shown in FIG. 4. The chrominance components C1, C2 of the component foreground video signal are input to two pairs of input multipliers, 42, 44 and 46, 48. The outputs of the first pair of multipliers 42, 44 are summed in a first combining circuit 50 to provide a central hue value. The outputs of the second pair of multipliers 46, 48 are summed in a second combining circuit 52 to produce a range of hue values. The range of hue values are input to an absolute value circuit 54, the sign of the output being determined by a sign value. The output of the absolute value circuit 54 is combined with the output of the first combining circuit 50 to produce a hue select signal HS that covers a range of hues either including or excluding the central hue value, depending upon the sign value.

Figure 5:
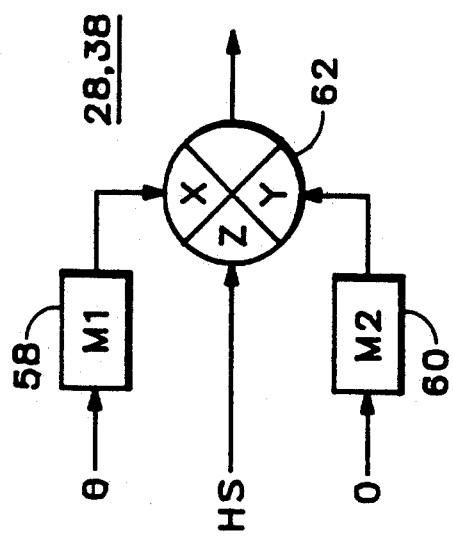
FIG. 5 is a block diagram of a typical matte generator for use in the present invention.

The matte generators 28, 38, as shown in FIG. 5, have first and second matte generators 58, 60. The first matte generator 58 is programmable according to an input hue value (theta), and produces only a chrominance output signal of the input hue value. The second matte generator 60 produces a constant luminance output value of zero (black). The outputs of the two matte generators 58, 60 are combined in a mixer 62 under control of the hue select signal HS. The resulting output of the matte generator 28, 38 is the specified hue where the hue select signal indicates detection of a hue value from the foreground chrominance signals that is within the selected range of hue values, and black, or zero, elsewhere.

Thus the present invention provides an improved chroma keyer with a secondary hue selector for reducing fringing effects by modifying the selected hue value in the areas where the fringing effect occurs.

What is claimed is:

1. A chroma keyer of the type that combines a shaped foreground video signal with a shaped background video signal to produce a composited output video signal, the shaped background video signal being a function of a background video signal and a primary chroma key signal derived from a foreground video signal and based upon a first hue range, comprising:

first means for generating a secondary chroma key signal from the foreground video signal based upon a second hue range;

second means for generating a fringe chrominance signal as a function of the secondary chroma key signal; and means for combining the fringe chrominance signal with the foreground video signal to produce the shaped foreground video signal.

2. The chroma keyer of claim 1 wherein the combining means comprises:

means for subtracting the fringe chrominance signal from the foreground video signal to produce a modified foreground video signal; and means for multiplying the modified foreground video signal by the primary chroma key signal to produce the shaped foreground video signal.

3. The chroma keyer of claim 1 further comprising means for processing the primary and secondary chroma key signals together to produce a control signal for input to the first means to produce the fringe chrominance signal.

4. The chroma keyer of claim 3 wherein the combining means comprises:

first means for subtracting the fringe chrominance signal from the foreground video signal to produce a first modified foreground video signal; and second means for subtracting a luminance signal from the first modified foreground video signal to produce the shaped foreground video signal, the luminance signal being a function of the primary chroma key signal.

5. The chroma keyer of claim 4 wherein the combining means further comprises:

third means for generating a suppression chrominance signal as a function of the primary chroma key signal; and third means for subtracting the suppression chrominance signal from the first modified foreground video signal to produce a second modified foreground video signal for input to the second subtracting means.

6. The chroma keyer of claim 3 wherein the combining means comprises:

first means for subtracting a luminance signal from the foreground video signal to produce a first modified foreground video signal, the luminance signal being a function of the primary chroma key signal; and second means for subtracting the fringe chrominance signal from the first modified foreground video signal to produce the shaped foreground video signal.

7. The chroma keyer of claim 6 wherein the combining means further comprises:

third means for generating a suppression chrominance signal as a function of the primary chroma key signal; and third means for subtracting the suppression chrominance signal from the first modified foreground video signal to produce a second modified foreground video signal for input to the second subtracting means.

8. The chroma keyer of claim 3 wherein the combining means comprises:

third means for generating a suppression chrominance signal as a function of the primary chroma key signal;

first means for subtracting the suppression chrominance signal from the foreground video signal to produce a first modified foreground video signal;

second means for subtracting the fringe chrominance signal from the first modified foreground video signal to produce a second modified foreground video signal; and third means for subtracting a luminance signal from the second modified foreground video signal to produce the shaped foreground video signal, the luminance signal being a function of the primary chroma key signal.

9. The chroma keyer of claim 3 wherein the combining means comprises:

third means for generating a suppression chrominance signal as a function of the primary chroma key signal;

first means for subtracting the suppression chrominance signal from the foreground video signal to produce a first modified foreground video signal;

second means for subtracting a luminance signal from the first modified foreground video signal to produce a second foreground video signal, the luminance signal being a function of the primary chroma key signal; and third means for subtracting the fringe chrominance signal from the second modified foreground video signal to produce the shaped foreground video signal.

* * * * *